United States Patent
Suh et al.

(10) Patent No.: US 11,790,016 B2
(45) Date of Patent: Oct. 17, 2023

(54) METHOD, DEVICE AND COMPUTER PROGRAM FOR COLLECTING DATA FROM MULTI-DOMAIN

(71) Applicant: S2W LAB INC., Gyeonggi-do (KR)

(72) Inventors: Sang Duk Suh, Gyeonggi-do (KR); Changhoon Yoon, Gyeonggi-do (KR); Seung Hyeon Lee, Daejeon (KR)

(73) Assignee: S2W INC.

( * ) Notice: Subject to any disclaimer, the term of this patent is extended or adjusted under 35 U.S.C. 154(b) by 242 days.

(21) Appl. No.: 17/431,697

(22) PCT Filed: Jan. 30, 2020

(86) PCT No.: PCT/KR2020/001382
§ 371 (c)(1),
(2) Date: Aug. 17, 2021

(87) PCT Pub. No.: WO2020/171410
PCT Pub. Date: Aug. 27, 2020

(65) Prior Publication Data
US 2022/0138271 A1 May 5, 2022

(30) Foreign Application Priority Data
Feb. 19, 2019 (KR) ................ 10-2019-0019087

(51) Int. Cl.
*G06F 16/00* (2019.01)
*G06F 16/951* (2019.01)
*H04L 9/40* (2022.01)

(52) U.S. Cl.
CPC ........ *G06F 16/951* (2019.01); *H04L 63/1425* (2013.01)

(58) Field of Classification Search
CPC ........................... G06F 16/951; H04L 63/1425
See application file for complete search history.

(56) References Cited

U.S. PATENT DOCUMENTS

| 10,044,736 | B1* | 8/2018 | Barger | H04L 63/145 |
| 10,862,907 | B1* | 12/2020 | Pon | G06F 16/955 |
| 11,570,188 | B2* | 1/2023 | Lavi | H04W 4/21 |

(Continued)

FOREIGN PATENT DOCUMENTS

| CN | 104796416 A | * | 7/2015 |
| CN | 107066569 A | * | 8/2017 |

(Continued)

OTHER PUBLICATIONS

International Search Report from PCT/KR2020/001382, dated May 12, 2020, 5 pages.

(Continued)

*Primary Examiner* — Leslie Wong
(74) *Attorney, Agent, or Firm* — Quarles & Brady (57) ABSTRACT

The present invention relates to a method for collecting data from a multi-domain in a data collection device. The method includes a step A of collecting data from a general web that is accessible through a search engine; a step B of collecting data from a dark web site that is not accessible with a general web browser and is accessible with preset specific software; and a step C of standardizing the collected data in a preset format and generating metadata for the collected data.

6 Claims, 4 Drawing Sheets

(56) References Cited

U.S. PATENT DOCUMENTS

| | | | |
|---|---|---|---|
| 2009/0204610 A1 | 8/2009 | Hellstrom | |
| 2011/0087646 A1 | 4/2011 | Dalvi | |
| 2018/0288073 A1* | 10/2018 | Hopper | H04L 63/1425 |
| 2020/0137094 A1* | 4/2020 | Janakiraman | G06N 20/00 |
| 2021/0021644 A1* | 1/2021 | Crabtree | G06F 21/577 |

FOREIGN PATENT DOCUMENTS

| | | | | |
|---|---|---|---|---|
| CN | 107808000 A | * | 3/2018 | ......... G06F 16/2228 |
| CN | 112347325 A | * | 2/2021 | ........... G06F 16/951 |
| CN | 115865427 A | * | 3/2023 | |
| KR | 100875636 | | 12/2008 | |
| KR | 101803225 | | 11/2017 | |
| KR | 101852107 | | 4/2018 | |
| KR | 102257139 B1 | * | 5/2021 | ......... G06F 16/9574 |
| WO | WO-2007050244 A2 | * | 5/2007 | ....... H04L 29/12066 |
| WO | WO-2011143542 A1 | * | 11/2011 | ......... H04L 63/1416 |

OTHER PUBLICATIONS

Kawaguchi, et al. "A Study of Relevance between Security Incidents and Market Commodities in Anonymous Tor Network" Computer Security Symposium 2017, Oct. 23-25, 2017.

Office Action with English Abstract dated Nov. 11, 2022 for Japanese App. No. 2021-546246.

Ono, et al. "Darkweb Analysis System Combining HSDir's Snooping and Active Scanning" IEICE Technical Report ICSS2017-68, dated Mar. 2018.

* cited by examiner

METHOD, DEVICE AND COMPUTER PROGRAM FOR COLLECTING DATA FROM MULTI-DOMAIN

CROSS-REFERENCE TO RELATED APPLICATIONS

This application is a 35 U.S.C. § 371 national phase application of PCT/KR2020/001382 (WO 2020/171410), filed on Jan. 30, 2020, entitled "Method, Apparatus and Computer Program for Collecting Data From Multiple Domains", which application claims priority to Korean Application No. 10-2019-0019087, filed Feb. 19, 2019, which is incorporated herein by reference in its entirety.

TECHNICAL FIELD

The present invention relates to a method for collecting and processing data. More specifically, the present invention relates to a system for collecting and processing vast amounts of data about arbitrary objects in a multi-domain including a general surface web as well as an invisible web requiring an access right.

BACKGROUND ART

Recently, with the development of Internet technology, information based on virtual world is overflowing. However, websites that can be accessed through a search engine in a general browser are only the tip of the iceberg in an entire web environment. There are a deep web that is connected to the Internet but requires access rights and an anonymized Dark Web that cannot be accessed with a general browser and can be accessed using specific software.

The dark web refers to a specific class of websites that exist on an encrypted network and cannot be accessed using a general browser. Many sites on the dark web are based on the Tor (The Onion Network) network. Tor Network, which has grown rapidly since 2010, is a network to which technology for user anonymity is applied, and is becoming a hotbed of various illegal transactions such as arms trade, drug trade, organ trade, sale of hacking tools, sharing of hacking technology, trade of personal information, and sale of pornography, using cryptocurrency.

In the Tor network, nodes in the network act as network routers, and address information of a specific node is distributed and stored in other nodes in the network. Since the Tor browser provides connection to a destination via a number of nodes randomly, the Tor network has a characteristic that it is impossible to trace a connection path between a service provider and a user.

SUMMARY OF INVENTION

Technical Problem

An object of the present invention is to provide a method of collecting and processing vast amounts of data about an arbitrary object in a general surface web as well as an invisible web requiring access rights.

Solution to Problem

According to an embodiment of the present invention, a method for collecting data from a multi-domain in a data collection device includes a step A of collecting data from a general web that is accessible through a search engine; a step B of collecting data from a dark web site that is not accessible with a general web browser and is accessible with preset specific software; and a step C of standardizing the collected data in a preset format and generating metadata for the collected data.

Advantageous Effects of Invention

According to the present invention, it is possible to collect general data accessible through a general web browser as well as special data accessible through a special browser in Internet environment. Furthermore, according to the present invention, there is an effect of analyzing information correlation by processing a large amount of data collected based on a multi-domain.

DESCRIPTION OF EMBODIMENTS

The The present invention is not limited to the description of the embodiments described below, and it is apparent that various modifications may be made within the scope without departing from the technical gist of the present invention. In describing the embodiments, descriptions of technical contents that are well known in the technical field to which the present invention pertains and are not directly related to the technical gist of the present invention will be omitted.

Meanwhile, in the accompanying drawings, the same components are represented by the same reference numerals. In the accompanying drawings, some components may be exaggerated, omitted, or schematically shown. This is to clearly describe the gist of the present invention by omitting unnecessary descriptions not related to the gist of the present invention.

Figure 1:
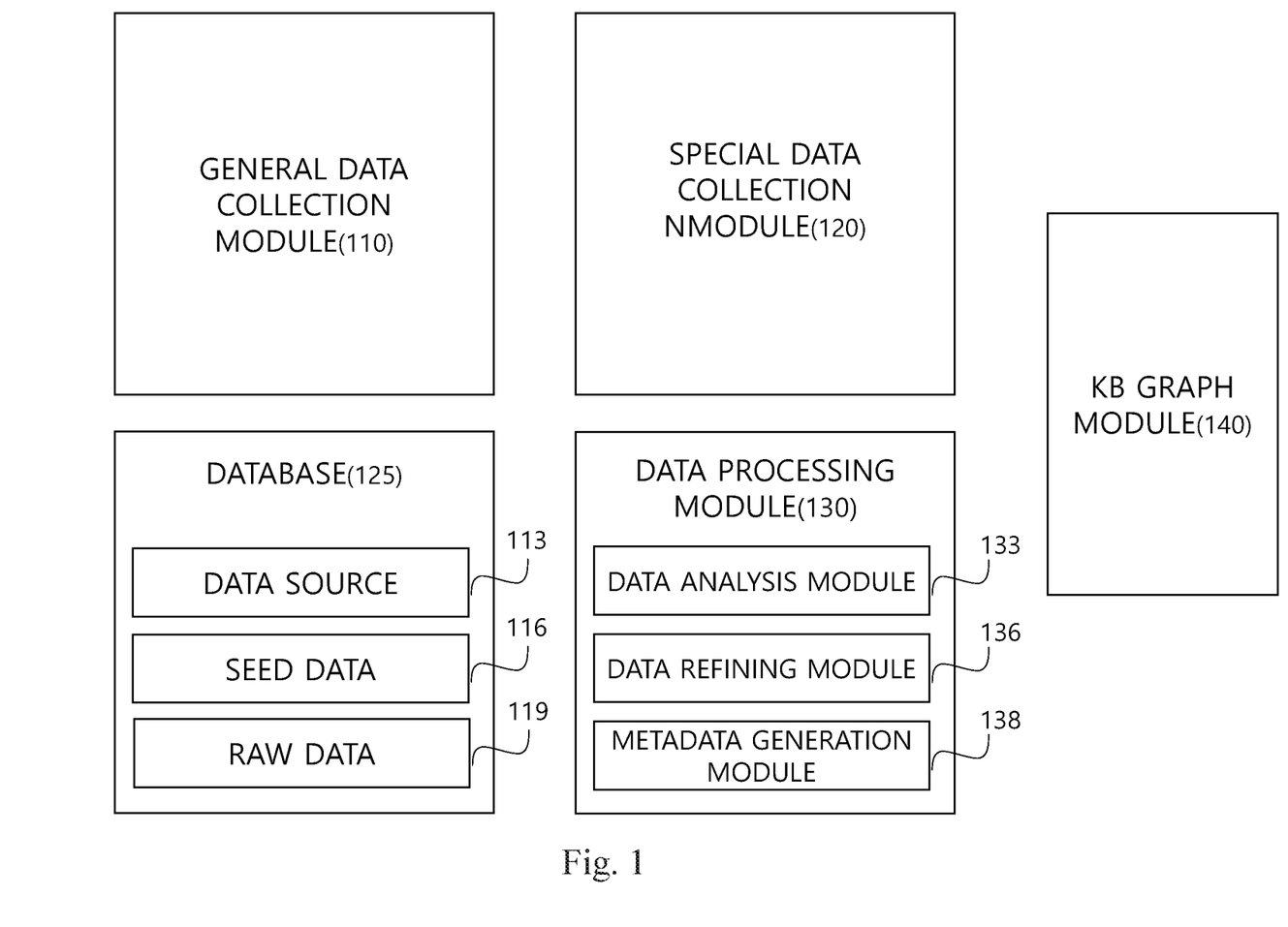
FIG. 1 is a diagram for describing an operation of a system for collecting a large amount of data in a multi-domain and analyzing correlation between the collected data according to an embodiment of the present invention.

FIG. 1 is a diagram for describing an operation of a system for collecting a large amount of data in a multi-domain and analyzing correlation between the collected data according to an embodiment of the present invention.

Referring to FIG. 1, a system according to the embodiment of the present invention may include a general data collection module 110, a special data collection module 120, a database 125, a data processing module 130, and a knowledge graph creation module 140.

The general data collection module 110 performs a function of collecting data published in a general web environment. According to a preferred embodiment of the present invention, the general data collection module may collect data by weighting sources of information related to crimes or threats.

For example, when collecting data related to illegal transactions such as malicious code, pornography, and personal information transactions, the general data collection module 110 may collect information 119 on illegal transactions in a manner of collecting email accounts recorded on general websites related to illegal transactions, SNS accounts linked to the email accounts, other email accounts recorded on the posts of the SNS accounts, or a Bitcoin transaction addresses recorded on the webpage and the posts. The collected information is refined in the data processing module 130 and the knowledge graph creation module 140 to be described later to infer a meaning or relationship thereof.

Meanwhile, a case of collecting malicious code binary data may be considered. According to conventional security solution, a security program is installed in a client device in the form of an agent, and when a malicious code is introduced into the client device, the security program collects the malicious code.

However, since recent malicious codes often target a small number of specific users, there is a problem in that it is difficult for the security program to collect all malicious codes in the conventional manner. Furthermore, according to the conventional method, there is a problem in that the malicious code binary data is collected after a user device is infected.

Accordingly, in order to solve the above problems, an object of the present invention is to provide a method for detecting and collecting malicious software before a client device is infected with malicious codes. To this end, according to an embodiment of the present invention, the general data collection module 110 and/or the special data collection module 120 may collect data sources 113 and seed data 116 and collect malicious code binary data 119 directly from a malicious code distribution and/or control server using the data sources 113 and the seed data 116.

More specifically, the general data collection module may first create a list of trusted data sources 113, which are accessible in a general web environment. The data sources may include, for example, websites, blogs, reports, and SNS accounts operated by domestic and foreign security companies and security organizations.

Thereafter, the general data collection module 110 may crawl all URL links existing in the web page corresponding to the list of data sources to collect the seed data 116 for malicious codes.

The seed data for malicious codes may be largely classified into two types.

The first seed data is an indicator of compromise, and refers to data used as an indicator or evidence for a cyber-intrusion incident found in the operating system of a network or device. According to an embodiment of the present invention, it is possible to identify whether a certain device is infected with a malicious code through the first seed data.

The second seed data may be data related to DNS of a control server that controls a malicious code having a Command & Control (C&C) infrastructure. The malicious code with C&C infrastructure stores the domain address of the control server in a binary or includes a domain address generation routine, and operates in a manner of continuously changing the IP address mapped to the domain. In this way, the malicious code control server operates to change the C&C without redistribution of a malicious code binary file.

The first seed data according to an embodiment of the present invention may include, for example, a name of a malicious software, a hash value of the malicious software (md5, sha1, sha256, or the like), an IP address of the Command & Control (C&C) that controls the malicious code, a domain address and a domain address generation routine, a name and type of a file created by malicious software, source codes and operation of the malicious software, and signatures found on a communication message of the malicious code, such as unique message structure, a developer ID, a reuse log of code snippets, or the like. The first seed data according to an embodiment of the present invention may include all data capable of specifying arbitrary malicious software in addition to the above examples.

For the collection of the first seed data, the general data collection module 110 according to the embodiment of the present invention may crawl and search, with a regular expression, all URL links existing in the webpage recorded in the list of data sources 113, extract data that can be used as an indicator or evidence for a cyber-intrusion incident found in the operating system of a network or device, and create the first seed data 116 by recording date of posting relevant information and data source together.

For example, in the case of Ranscam which is malicious codes, the data source may be the Cisco Talos blog (https://blog.talosintelligence.com/2016/07/ranscam.html). The general data collection module may extract the first seed data for Ranscam from the blog.

For example, on the Cisco Talos blog (https://blog.talos-intelligence.com/2016/07/ranscam.html), a crawler may extract, as the first seed data which is a threat indicator of Ranscam, an SHA256 hash function, which is the hash value of the Ranscam source code, a domain address of a server which the malicious software is trying to communicate with, and The IP address, a name of a file created by the malicious software, and a domain registrant's email address.

Meanwhile, the second seed data for the DNS information of the malicious code control server may be extracted in a manner of securing a list of IP addresses used by an attacker by monitoring the IP address mapped to the domain collected from the data source. The reason for this is that the same attacker is more likely to use the list of same or similar IP addresses when distributing new malicious software.

More specifically, the second seed data may be created by collecting passive DNS replication information from data sources, searching for the IP address and domain address of C&C contained in the first seed data, extracting domain information based on a search result, parsing an IP address, a domain address, domain registrant information, registration expiration date, or the like, and storing them along with the domain information.

Thereafter, the general data collection module 110 may collect data 119 on a malicious code and URL path to access the malicious code, a malicious code file, or a malicious code developer and trader by using new IP addresses and domain addresses obtained from the first and second seed data for malicious codes.

For example, the general data collection module 110 may collect data sources for malicious codes, that is, DNS reflection information through a DNS information retrieval service operated by network security companies or security organizations, identify the DNS reflection information and other IP links recorded in the C&C IP address and the domain address by searching the C&C IP address and domain address of the seed data, generate a URL path to malicious codes by performing track until there are no more links to traverse, and acquire raw data 119 for a malicious code binary file according to the URL path.

In this case, the malicious code sales site may be a hidden general web or may be based on a dark web that cannot be accessed with a normal browser. When malicious codes are traded on the dark web, the special data collection module 120 may acquire a corresponding sales site address and a malicious code file, and specific details thereof will be given later in the description of the special data collection module 120.

Furthermore, the data processing module 130 may perform pre-processing to filter out invalid or unnecessary information from the collected raw data, and may label whether the collected data actually corresponds to malicious codes. The operation of the data processing module 130 will be described later.

On the other hand, the general data collection module may acquire URL information of another sales site through analysis of the malicious codes, and acquire data 119 capable of tracking an email account recorded on the sales site, or the developer or trader of the malicious codes through the SNS account linked to the email account.

In this case, when the transaction for malicious codes is made through bitcoin, the special data collection module 120 may acquire bitcoin transaction data, and specific details thereof will be given later in the description of the special data collection module 120.

Meanwhile, the special data collection module 120 may perform a function of collecting data from a deep web that requires separate access rights, a dark web that can only be accessed with a specific browser, and/or a cryptocurrency network that has recently become a transaction means of illegal transactions.

More specifically, in the case of the deep web that requires access rights, the special data collection module 120 may prepare the data source 113 for a watchlist such as secret community and hacking forum in advance, acquire a access right to the data source, collect the seed data 116 that is the basis of the search in the data source, identify another connected IP link from an IP recorded in the seed data, and collect data 119 posted on a deep web server, including security keywords related to crime and threats by tracking until there are no more links to traverse.

However, in the case of the dark web, there is a problem that a general search engine cannot be utilized because the network defends the search or crawlers of the general method. Furthermore, in the case of cryptocurrency, which is a means of illegal transactions, since the transaction ledger is decentralized and managed using encryption algorithms and peer-to-peer networks, data on the transaction ledger cannot be collected using a general search engine, similar to dark web data, and a separate device for collecting transaction ledger data is required.

Therefore, the special data collection system 120 according to the embodiment of the present invention can build a system 200 for collecting the data 126 of the dark web and a system for collecting the transaction ledger data.

Figure 2A:
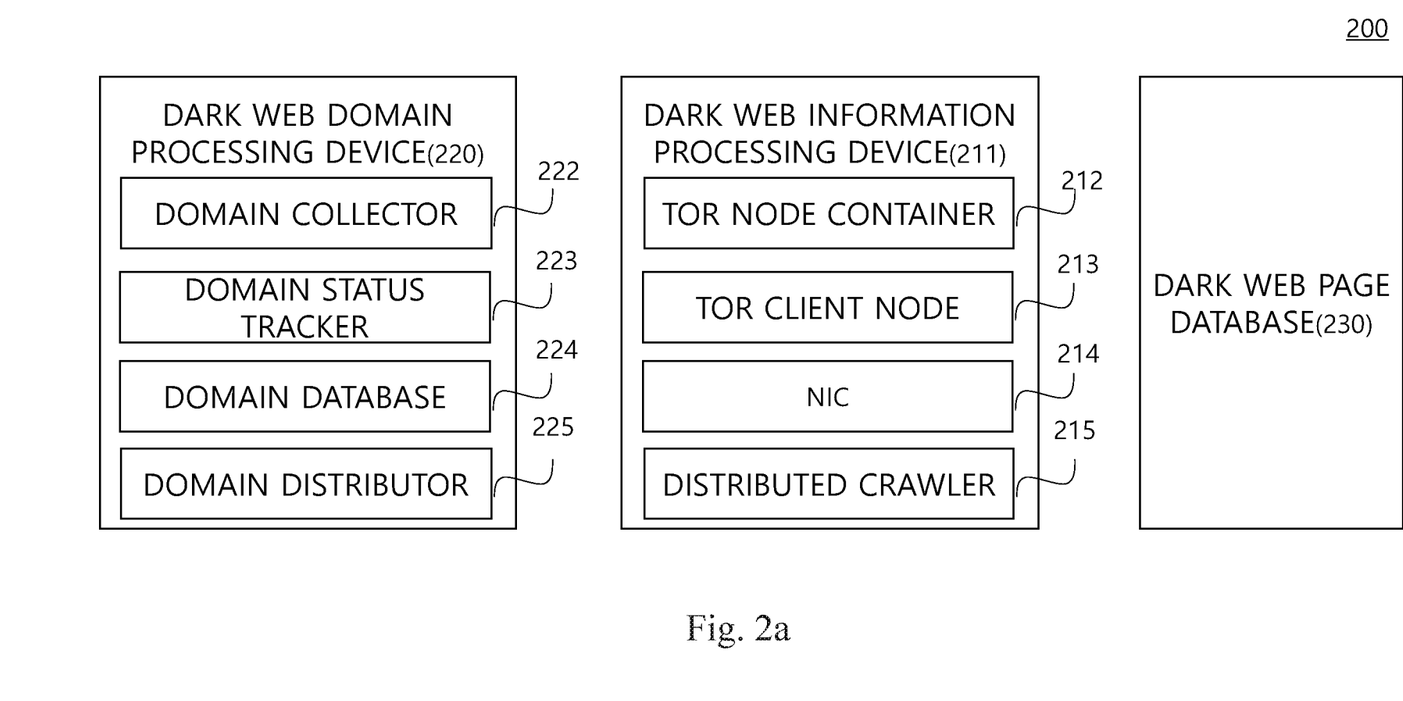
FIG. 2A is a diagram for describing a configuration of a system for collecting data in a Tor network according to an embodiment of the present invention.
Figure 2B:
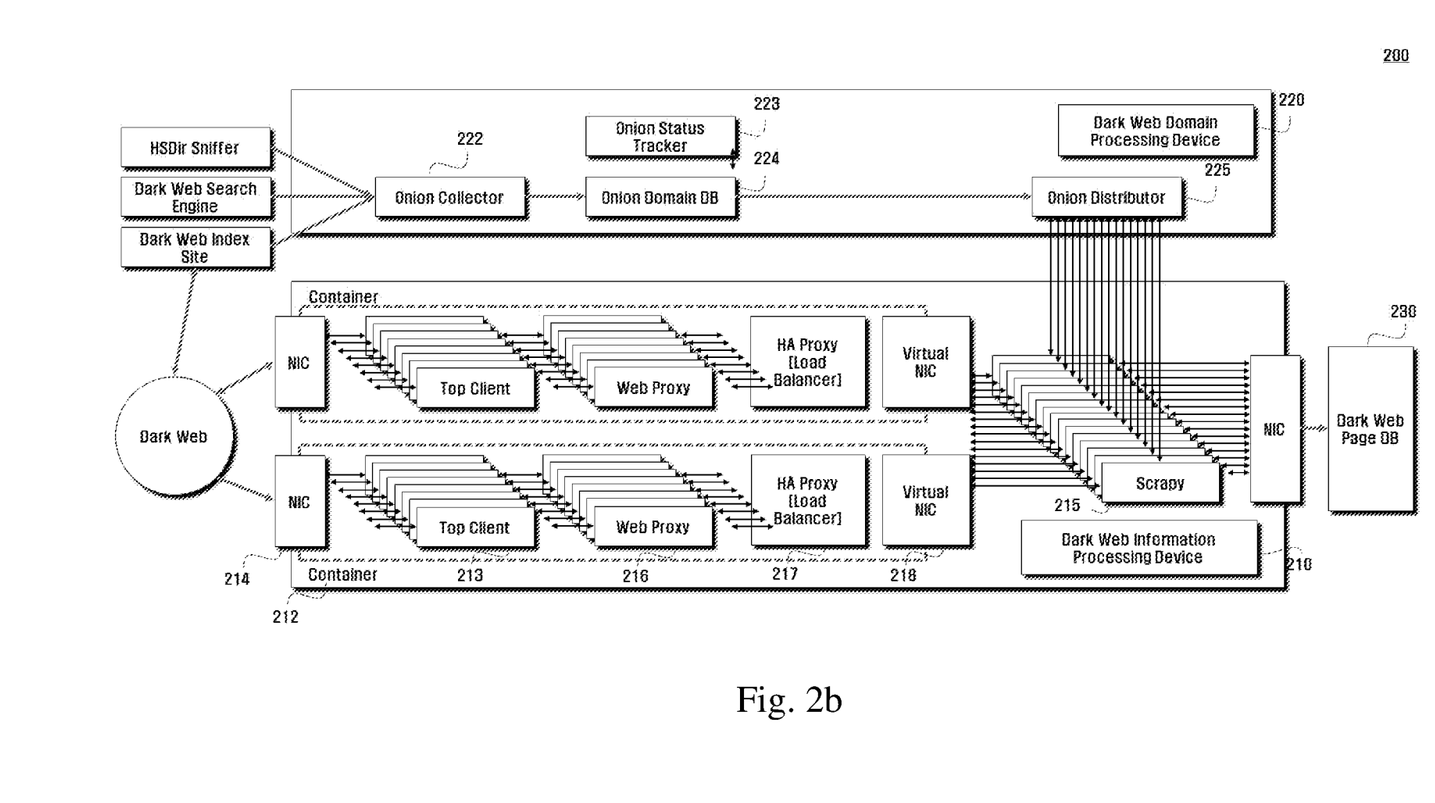
FIG. 2B is a diagram for describing a configuration of a system for collecting data in a Tor network according to another embodiment of the present invention.

FIG. 2 is a diagram for describing the configuration of a system for collecting dark web data according to an embodiment of the present invention.

In the example of FIG. 2A, a system 200 for collecting dark web data according to an embodiment of the present invention may include a dark web domain processing device 220, a dark web information processing device 210 and a dark web page database 230. When the domain processing device 220 determines a domain from which the dark web information is collected, the dark web information processing device 210 may perform a function of storing all information on a website acquired from a corresponding domain in the database 230.

More specifically, the dark web domain processing device 220 according to an embodiment of the present invention may include a domain collector 222, a domain status tracker 223, a domain database 224, and a domain distributor 225.

The domain information collector 222 according to an embodiment of the present invention may collect a domain address by using Tor search engine such as FreshOnions or collect a domain address by referring to information recorded on a dark web domain index site, and store the domain address in the domain address database 224.

Meanwhile, the Tor network is a tool used for network bypass and anonymization, and many online black markets reside in a domain on the Tor network. Such a black market is characterized by frequently changing domain addresses to reduce the possibility of tracking and closing websites or re-operating closed websites. Accordingly, the dark web domain processing device 220 according to the embodiment of the present invention includes a domain status tracker 223 as shown in the example of FIG. 2B, and the domain status tracker 223 may perform a function of identifying the statuses of the collected domain addresses at a preset cycle.

For example, the domain status tracker 223 may identify status change information of domains existing in the domain address database in such a way of identifying whether the collected domains are registered using the STEM API of Tor, at a preset cycle. That is, information on whether the collected domain addresses are closed, operated, or changed may be collected, and the domain database 224 may store status change data of domains together as metadata for domain address data.

Furthermore, the distributor 225 according to an embodiment of the present invention may operate to preferentially distribute, to a distributed crawler 215, domains which are identified as being most recently registered while referring to the registration statuses of the domains. The reason for this is to minimize the waste of time and resources required for data collection in consideration of the nature of the dark web where domains are frequently changed.

More specifically, the domain distributor 225 according to the embodiment of the present invention may preferentially distribute, to the crawler 215, domains which are identified as being most recently registered, while referring to the registration status of domains identified in advance by the domain status tracker 223.

On the other hand, the domain distributor 225 according to the embodiment of the present invention may identify the status of each crawler instance of the distributed crawler 215, and immediately allocate a domain to be crawled to the crawler instance that has completed the crawling. This is because the sizes of the websites connected to the domains are different, and the time required to crawl varies depending on the status of the Tor network. Therefore, when domains are dynamically allocated to crawler instances by the domain distributor 225 according to the embodiment of the present invention, the utilization of the distributed crawler 215 is maximized and a large amount of data is collected in as little time as possible.

Meanwhile, the Tor network, which is the basis of most of the dark web, has a structure in which a channel is established through several client nodes that are running a Tor router in the middle without communicating to a destination at once. Therefore, a communication speed is very slow compared to a normal browser. Furthermore, since packets are encrypted every time the packets pass through a node to ensure anonymity, most nodes need to be controlled to find out the paths of the packets.

In order to solve this problem, the system 200 for collecting dark web data according to an embodiment of the present invention is characterized in that the dark web information processing device 210 is operated in the form of a Tor proxy middle box that operates a plurality of Tor nodes. This is to collect data by directly operating a Tor node constituting a dark web architecture because a general crawler does not operate due to the structure of the dark web.

Further, the dark web information processing device 210 in the form of the Tor proxy middle box according to an embodiment of the present invention may configure at least one or more Tor node containers 212, operate a plurality of Tor client nodes 213 in the container 212, and provide network card, NIC 214 and web proxy 216 network functions to each of the nodes.

In addition, a plurality of distributed crawlers 215 may be operated in parallel, and a large amount of dark web traffic generated according to the operations of the distributed crawlers 215 may be allocated to the Tor client nodes 213, which are being directly operated, through a load balancer 217 and the web proxy 216.

Considering the structure and slow speed of the Tor network, there is a problem in that a serious bottleneck occurs when a process of accessing domains of the Tor network and collecting a large amount of information is performed. The above architecture of the present invention is designed to forward all requests generated by the distributed crawlers 215 to the dark web and forward responses from the dark web to the distributed crawlers 215, without bottleneck.

More specifically, first bottleneck that becomes an obstacle to dark web data collection may occur due to the network environment in which a data processing device, that is, a middle box 211 is disposed. For example, when the performance of network equipment that provides a network to the middle box 211 is insufficient or a bandwidth is limited by network policies such as IP-based bandwidth restrictions, a bottleneck may occur.

To solve this problem, a Tor proxy middle box 211 according to an embodiment of the present invention may deploy a plurality of network cards (NICs) 214 on one physical server and allocate a plurality of public IPs to the network cards to physically distribute traffic to the dark web. In order to distribute traffic, the middle box may operate a plurality of virtual containers 212 including a plurality of Tor clients 213.

Thereafter, the middle box may perform load balancing 217 on incoming dark web traffic and forward a result of the load balancing to each container, and each container is configured to forward requests to the dark web through each NIC, solving the physical bottleneck.

Second bottleneck that impedes dark web data collection may occur when Tor clients process multiple requests in parallel. The reason for this is that a load occurs when a single Tor client handles a large number of requests of distributed crawlers on the dark web.

To solve this problem, the Tor proxy middle box 211 according to an embodiment of the present invention may be implemented such that a plurality of virtual containers is operated and each container operates a plurality of Tor clients. Accordingly, it is possible to resolve the bottleneck that occurs in Tor clients in a way that each container distributes received requests to a plurality of Tor clients that are being operated.

Figure 3:
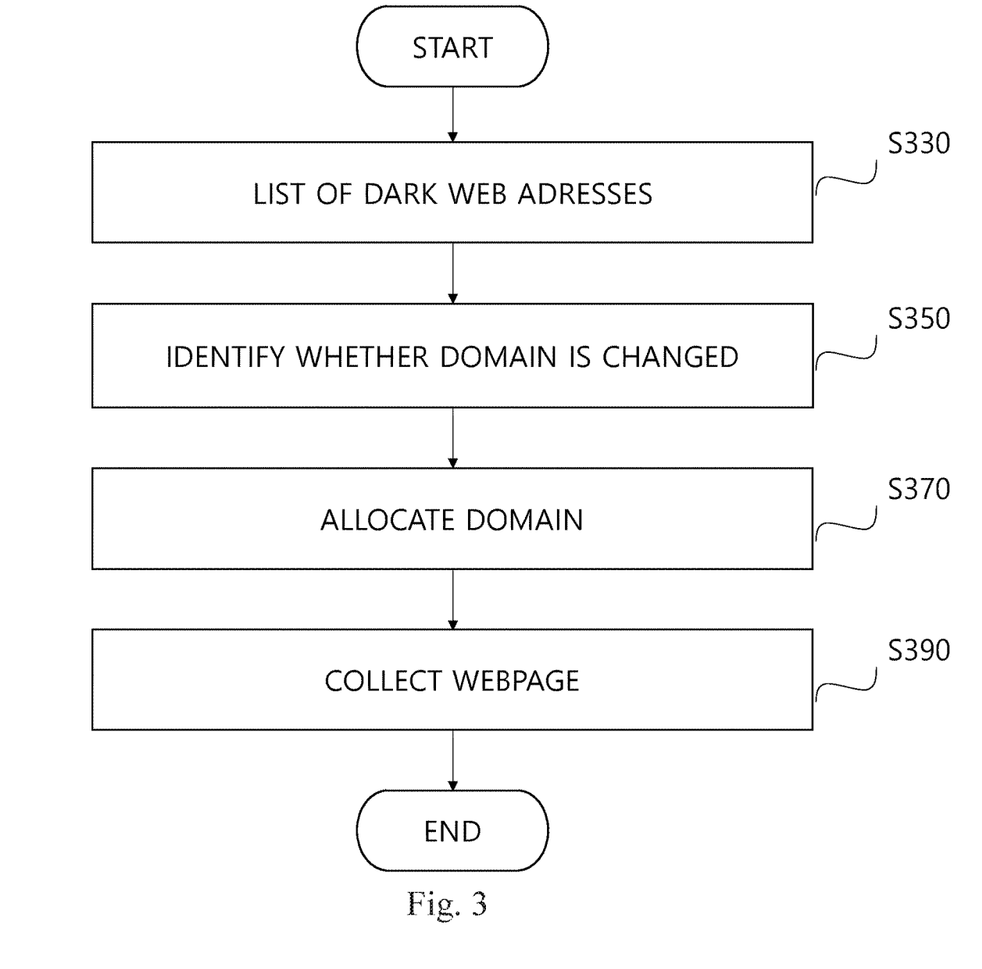
FIG. 3 is a diagram for describing a process for collecting data of a Tor network according to an embodiment of the present invention.

FIG. 3 is a diagram for describing a process of collecting data of the Tor network in the system 200 for collecting dark web data according to an embodiment of the present invention.

A dark web data collection system 200 according to an embodiment of the present invention may first collect a list of domains of the Tor network. (step 330)

To this end, the dark web domain collection device 220 of the dark web data collection system 200 according to an embodiment of the present invention may collect domain addresses using a Tor search engine, such as Ahmia and FreshOnions, or a dark web index site.

Furthermore, domain addresses on the Tor network may be collected by crawling text content in corresponding addresses using the collected domain addresses as seeds and tracking links included in dark web pages until there are no more links to traverse.

In step 350, the dark web data collection system 200 may identify the status of the collected domain addresses at a preset cycle. For example, the dark web data collection system 200 may, using Tor's STEM API, identify whether the corresponding domain is operated or closed or identify whether the contents of a web page operated by the corresponding domain have been added, deleted, or changed and record the status change information in metadata for the corresponding domain.

Thereafter, the dark web data collection system 200 may implement distributed crawlers and a plurality of containers operating a plurality of Tor nodes, and allocate the collected domains to the distributed crawlers. (step 370)

More specifically, the dark web data collection system 200 according to an embodiment of the present invention may preferentially allocate, to distributed crawlers, domains which are identified as being most recently registered while referring to the registration status of domains identified in advance, or dynamically allocate a domain to be subsequently crawled to a crawler instance that has completed crawling by identifying the status of each crawler instance constituting the distributed crawler.

Then, the traffic generated according to the crawler's operation is forwarded to each container through a load balancer, and each container forwards a request to a dark web through a connected NIC. The crawler collects all dark web pages operated in the corresponding domain and record them in a database. (step 390)

Returning to the description of FIG. 1 again, the special data collection module 120 may include a cryptocurrency transaction data collection module.

The cryptocurrency transaction data collection module may perform a function of collecting distributed ledger information of a blockchain corresponding to an arbitrary cryptocurrency and standardizing the blockchain data extracted from the distributed ledger information.

More specifically, the cryptocurrency transaction data collection module operates one or more cryptocurrency clients, which may be executed to collect distributed ledger information of the blockchain. Whether to execute the cryptocurrency client may be determined by the user's request.

The cryptocurrency transaction data collection module may request transaction information from the API of the cryptocurrency client to collect distributed ledger information corresponding to the request when the cryptocurrency client provides the API. When the cryptocurrency client does not provide an external API, the cryptocurrency transaction data collection module may collect distributed ledger information by parsing block data managed by the cryptocurrency client.

The collected distributed ledger information may be analyzed in the data processing module 130. For example, the data processing module 130 may group the cryptocurrency addresses to estimate the owner of the cryptocurrency addresses included in the distributed ledger information.

For grouping cryptocurrency addresses, at least one of a multi-input heuristic algorithm that groups a plurality of input addresses included in one transaction, a group integration algorithm that groups multiple groups containing the same address into one group using a private key used for transactions, an address change heuristic algorithm that groups multiple addresses presumed of the same owner using an address for which the balance is returned after remittance may be used. In addition, a user-defined heuristic algorithm may be used, and address filtering and/or address grouping may be performed according to a user command.

Meanwhile, in the example of FIG. 1, the database 125 collected by the operations of the general data collection module 110 and the special data collection module 120 may be in a unstructured state as data collected from a multi-domain. Therefore, a process of pre-processing a large amount of unrefined data is required, and a corresponding function may be performed by the data processing module 130.

More specifically, the data processing module 130 according to an embodiment of the present invention may perform a function of extracting and processing information by applying different technologies according to types for a large amount of collected data, and may include a data analysis module 133, a data refining module 136 and a metadata generation module 138.

For example, when the collected data is a structured or unstructured document, the data analysis module 133 may apply a natural language processing technology to the collected document to determine the meaning, and the data refining module 136 may standardize the form of the unstructured document according to a preset format. As another example, when the collected data is an image, the data analysis module 133 may extract an image of the file and determine the contents of the image through image processing. At the same time, the data refining module 136 may extract text from the extracted image by using optical character recognition (OCR) technology and standardize the text according to a preset format. Furthermore, the metadata generation module 138 may generate metadata about a creator of the image to be analyzed, creation time, source domain information, and the like.

On the other hand, when the collected data is an executable file, the data analysis module 133 may analyze the contents of the executable file to determine whether the executable file is malicious code, and the data refining module 136 may create a plurality of URL paths through which the executable file accesses the malicious code based on the collected domain information. Furthermore, the metadata generation module 138 may generate metadata about the hash of the corresponding malicious code, a file type, and the malicious code access counter information of each URL path.

Such data processing may be performed according to the request of the knowledge graph creation module 140. That is, the data refining module 136 may standardize the information collected in the multi-domain in a form that can be recorded in the knowledge graph according to the format of the knowledge graph, and the data analysis module 133 may extract an object from the information collected based on the knowledge graph.

For example, when the collected data is a cryptocurrency transaction record, that is, distributed ledger information, the data analysis module 133 may analyze the distributed ledger information to acquire additional information not included in the distributed ledger. For example, the cryptocurrency addresses may be grouped to estimate the owner of the cryptocurrency addresses included in the collected distributed ledger information.

For grouping cryptocurrency addresses, at least one of a multi-input heuristic algorithm that groups a plurality of input addresses included in one transaction, a group integration algorithm that groups multiple groups containing the same address into one group using a private key used for transactions, an address change heuristic algorithm that groups multiple addresses presumed of the same owner using an address for which the balance is returned after remittance may be used. In addition, a user-defined heuristic algorithm may be used, and address filtering and/or address grouping may be performed according to a user command.

The multi-input heuristic algorithm may use the transaction property of a cryptocurrency in which a plurality of input addresses and a plurality of output addresses (or target addresses) can be used in one transaction. When a single transaction includes input addresses (public addresses) a, b, and c, a, b, and c are likely to be accounts of the same owner. Therefore, the blockchain data analysis module 115 may group a, b, and c as the addresses of the owner X.

The group integration algorithm takes advantage of the fact that the owner needs to possess the private key to create a transaction input. When Transaction 1 including input addresses a, b, and c and Transaction 2 including input addresses c, d, and e exist, the group integration algorithm estimates the owners of a, b, c, d, and e as being the same. Accordingly, in this case, the data analysis module 133 may group addresses a, b, c, d, and e into the addresses of the owner X.

The address change heuristic algorithm may utilize the feature that an address is newly created to get the balance back every time a cryptocurrency transaction is made. For example, when X, who owns 10 UTXO (unspent transaction output) at address a, remits 8 UTXO to Y, a new address a' is created for X, and the balance of 2 UTXO may be deposited into a'. Therefore, the blockchain data analysis module 115 may determine that a and a' belong to the same owner, and a and a' may be grouped by the addresses of the owner X.

The data refining module 136 may standardize blockchain data, including distributed ledger information and cryptocurrency address group information analyzed by the data analysis module, according to preset criteria. The distributed ledger information may include intra-block transaction information such as block creation time, input/output amount, transaction fee, cryptocurrency block data such as previous block and next block, transaction volume, fee, input/output cryptocurrency address, or the like and may be managed as metadata generated by metadata generation module 138. Therefore, the standardized block chain data may include cryptocurrency block data and intra-block transaction information included in the distributed ledger information of various cryptocurrencies, and include the type of cryptocurrency and the cryptocurrency address group information analyzed by the data analysis module 133.

Meanwhile, in the example of FIG. 1, the knowledge-based graph module 140 may construct refined data in the form of a knowledge graph to perform a function of identifying relationship and correlation between objects. A knowledge-based graph can consist of nodes and edges.

More specifically, the KB graph module 140 may pre-create a model for an object operating as a node in the knowledge graph, and the node model according to the embodiment of the present invention may be divided into a concept and an instance and created in a tree form. For example, the node model may mean each of the data for the aforementioned seed data, DNS, malicious code, Bitcoin transaction address, or the like. The detailed information of the corresponding node may be indexed using a label.

The node model may be created for a global domain such as a person, job, place, country, or company, or may be created for a specific domain such as a vulnerability, a product, or a cyber-attack. In this case, the graph creation module 140 may set a label for the node in order to distinguish different types of data. The label may include attribute information of the node.

Furthermore, the KB graph module 140 may record the contents of an edge describing the relationship between the nodes of the knowledge graph. The edge may represent correlation between node objects. In this case, all edges include directionality, and labels may be set for edges according to a type of correlation.

Furthermore, the KB graph module 140 may utilize the database 125 collected from a multi-domain to expand the knowledge graph. For example, the graph creation module 140 may request the data processing module 130 to apply natural language processing technology to information recorded in the database to determine a sentence structure and identify the relationship between objects included in a sentence.

Based on this, the KB graph module 140 may request the data processing module 130 to extract information about objects and/or relationships between objects from the collected data, and add the information to the knowledge graph in the form of nodes or edges to expand a texonomy graph or create an entity graph that is mapped to a pre-built knowledge graph.

Furthermore, the KB graph module 140 may analyze the correlation between objects or predict an arbitrary event based on the KB graph.

For example, the KB graph module 140 may configure the KB graph in multiple layers. For example, in the case of cryptocurrency transaction records, the graph creation module 140 may build a first knowledge graph for cryptocurrency transactions using standardized block chain data processed by the data processing module 130, build a second knowledge graph, for example for malicious code transactions, using standardized multi-domain data, and create a multi-layer-based transaction analysis knowledge graph by mapping the first knowledge graph and the second knowledge graph.

In this case, the cryptocurrency network graph which is the first knowledge graph may create a first node with the first object or first property extracted from the standardized block chain data, and build a cryptocurrency network graph using the relationship (edge) between the nodes. For example, a network graph such as cryptocurrency input address (object node)—transfer amount (edge)—cryptocurrency output address (object node), or a network graph such as owner X (object node)—transfer amount (edge)—ransomware (property node) may be created.

Furthermore, the knowledge graph creation module 140 may create a second node with the second object or second attribute extracted from the standardized multi-domain data, and build a second knowledge graph using the relationship (edge) between the nodes. For example, the knowledge graph creation module 153 may create nodes and edges such as user ID (object node)—owner (edge)—cryptocurrency address (object node) using profile data extracted from a web page and build a second knowledge graph by creating nodes and edges such as cryptocurrency address (object node)—deposit (edge)—product (object node) using sales data extracted from the web page. The second knowledge graph may also have a multi-layer structure with one or more layers like the first knowledge graph for the cryptocurrency transaction record. The knowledge graphs for layers may belong to different categories.

The knowledge graph creation module 140 may create a transaction analysis knowledge graph by mapping a first node and a second node corresponding to each other. For example, a case where the node A included in the first layer of the cryptocurrency network graph corresponds to the address a, the node B corresponds to the address b, the two addresses belong to the same group, and the node C included in layer #1 of the knowledge graph is the cryptocurrency address b can be considered.

Since the node B and the node C contain the same information, they can be mapped to each other. That is, the knowledge graph may have a multi-layer structure in which the nodes of the first knowledge graph for the cryptocurrency transaction record and the second knowledge graph are mapped to each other. Therefore, if the transaction analysis knowledge graph is used, it is possible to interpret the components of the first knowledge graph for the cryptocurrency network with the components of the second knowledge graph. For example, when the node C is connected to the node D representing a user ID through an owner edge, it may be inferred that the owner of the addresses a and b is a person with the user ID corresponding to the node D.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

What is claimed is:

1. A method for collecting data in a data collection device, comprising:
   a step A of collecting data using a distributed crawler from a dark web site belonging to a network where channels are established by randomly connecting at least one or more network nodes that perform network routing functions, the dark web being not accessible with a general web browser and being assessable with preset specific software; and
   a step B of standardizing the collected data in a preset format and generating metadata for the collected data, wherein the step A includes
   collecting domain information of the network;
   identifying whether collected domains have been changed, and preferentially allocating a domain which is identified as being most recently registered to the distributed crawler; and
   operating a plurality of network nodes that perform the routing function and collecting data from the dark web corresponding to an arbitrary domain by processing a request of the distributed crawler in the network nodes.

2. The method of claim 1, further comprising:
   a step C of creating a knowledge-based graph, updating the knowledge-based graph based on standardized data and the metadata, and tracking a crime based on the knowledge-based graph.

3. The method of claim 1, before the step A, further comprising:

creating a list of data sources that are accessible in a general web environment in which reliable information about malicious codes is recorded;

collecting first seed data used as an indicator for malicious code attack in an operating system of a network or device by crawling a URL link existing in a web page corresponding to the list of data sources;

collecting second seed data for DNS information of a server that controls a malicious code having a Command & Control (C&C) infrastructure by monitoring an IP address mapped to a domain collected from the data source or monitoring domain information or IP address information included in the first seed data; and creating at least one URL path for accessing a specific malicious code by linking domain information or new IP address information acquired from the first seed data and the second seed data, and collecting malicious code binary data.

4. The method of claim 3, wherein the allocating to the distributed crawler includes collecting status information on whether a collected domain address is closed, operated, and/or changed at a preset cycle, and generating the status information as metadata for the collected domain address; and preferentially allocating, to the distributed crawler, a domain which is identified as being most recently registered in the status information.

5. The method of claim 4, wherein the allocating to the distributed crawler includes allocating a domain to be subsequently crawled to a crawler instance that have completed crawling among from crawler instances constituting the distributed crawler.

6. The method of claim 5, wherein the allocating to the distributed crawler includes configuring at least one or more Tor node containers and setting a plurality of network cards in the container;

executing a plurality of Tor node clients in each of the containers and providing a web proxy function and a load balancing function to the Tor node client; and allocating a large amount of dark web traffic generated according to operation of the distributed crawler to the Tor node clients through the load balancing function and the web proxy function.

* * * * *